UNITED STATES PATENT OFFICE.

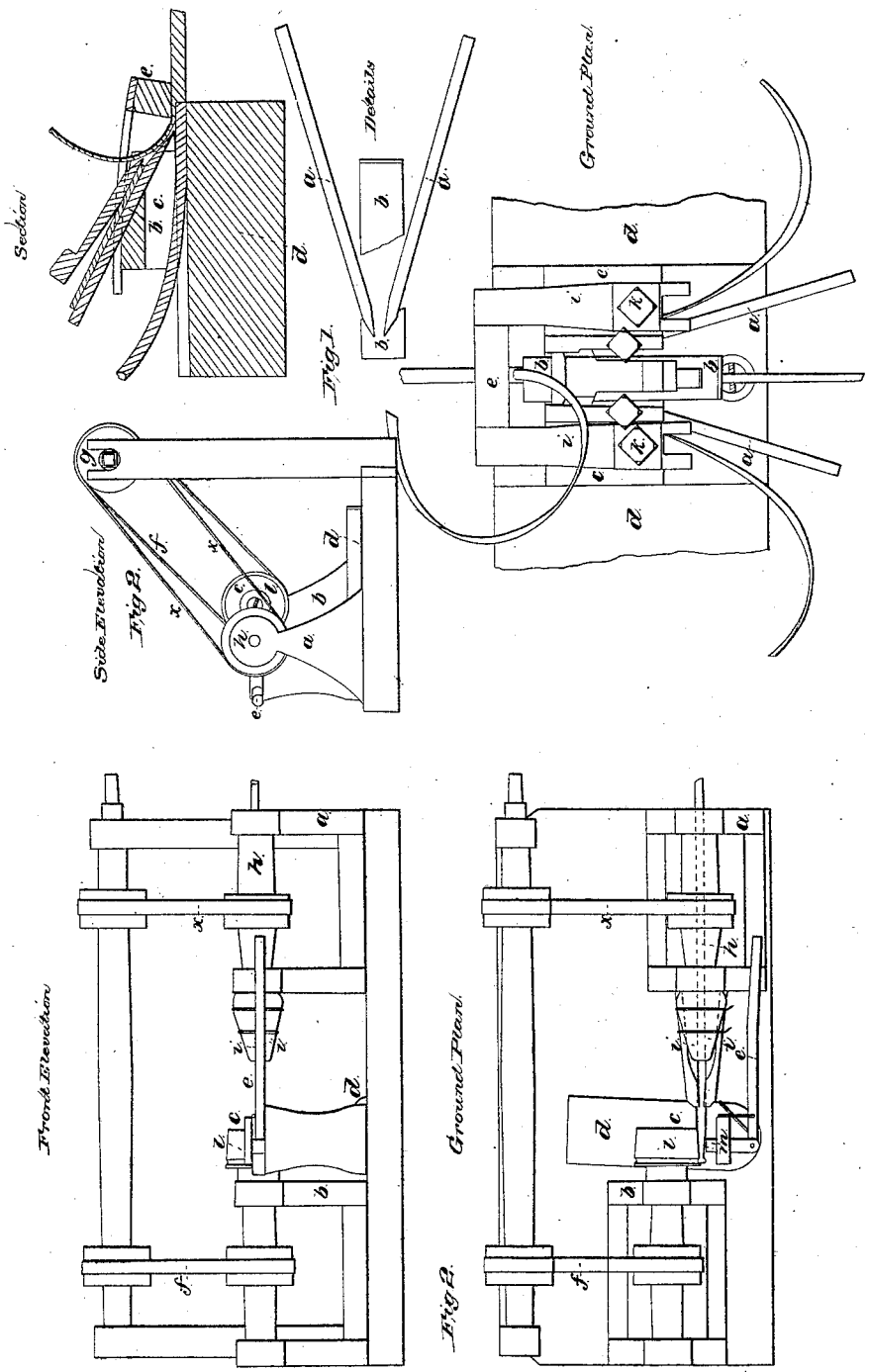

JAMES W. MARTIN, OF PHILADELPHIA, PENNSYLVANIA.

METHOD OF PREPARING RATAN FOR UMBRELLAS.

Specification of Letters Patent No. 16,063, dated November 11, 1856.

*To all whom it may concern:*

Be it known that I, JAMES W. MARTIN, of Philadelphia, in the county of Philadelphia and State of Pennsylvania, have invented a new and Improved Mode of Manufacturing Ratan and Whalebone for Umbrellas and Similar Purposes, and that the following is a full, clear, and exact description of the principle or character which distinguish it from all other things before known and of the usual manner of making, modifying and using the same, reference being had to the accompanying drawing.

The nature of my improvement consists in squaring the ratan or whalebone in a machine made for the purpose and then turning their ends into proper form for the purpose.

The apparatus for squaring the ratans is composed of three knives $a$, $a$, $b$, formed and placed like ordinary plane irons at an angle to the line of cut and in relative position so as to form three sides of a square as clearly shown in the drawing Figure 1. These knives are confined in a suitable frame ($c$) affixed to a permanent bench or other fixture ($d$) which forms the fourth side of the square and acts as a guide to the ratan, it being faced with metal for that purpose and slightly grooved to fit the curve of ratan. Just in front of the knives there is a block of metal ($e$) with a groove on its under side directly above and facing the groove before named in the bench below. This block is held down by means of stout springs ($i$) by which it is kept in place and caused to bear upon the ratan as it enters between the knives. The bolts ($k$) which fasten said springs pass down through the stock and confine it to the bench and the knives to their position. The cutter for tipping the ratan is a bur cutter ($c$) of the Fig. 2 of proper configuration. It is affixed to the end of a mandrel supported by puppet heads (8, Fig. 2,) in the ordinary way and is driven by a band ($f$) from the driving shaft ($g$) by which it receives a rapid revolution. Parallel to this mandrel of the bur cutter ($c$) there is a hollow mandrel ($h$), but this mandrel is located beyond the end of the cutter ($c$) and a little on one side. It has in its end next to the cutter ($c$) two jaws ($i$, $i$,) which grasp the piece of ratan that passes through the mandrel ($h$). The ratan projects far enough beyond the jaws to be brought against the bur cutter by which it is shaped. It is kept pressed against said cutter by a spring rest ($e$) and is caused to revolve against the cutter as it revolves by means of a band ($x$) connecting its mandrel ($h$) with the driving shaft ($g$). The revolution of the two mandrels produces the desired effect.

Having thus fully described my apparatus what I claim therein as new and desire to secure by Letters Patent is—

The combined devices as herein described, for forming and tipping the ratans or whalebone for umbrella ribs.

JAS. W. MARTIN.

Witnesses:
   N. NUCKOLLS,
   J. D. CLARK.